(12) United States Patent
Hans et al.

(10) Patent No.: US 8,577,004 B2
(45) Date of Patent: Nov. 5, 2013

(54) PREDICTIVE CONTACT INFORMATION REPRESENTATION

(75) Inventors: Martin Hans, Bad Salzdetfurth (DE);
Andreas Schmidt, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 388 days.

(21) Appl. No.: 12/704,211

(22) Filed: Feb. 11, 2010

(65) Prior Publication Data

US 2011/0194682 A1 Aug. 11, 2011

(51) Int. Cl.
*H04M 3/42* (2006.01)

(52) U.S. Cl.
USPC ............ 379/201.12; 379/201.07; 379/201.02; 379/201.03

(58) Field of Classification Search
USPC .............. 379/201.04, 201.02, 93.23; 370/260
See application file for complete search history.

(56) References Cited

U.S. PATENT DOCUMENTS

| | | | |
|---|---|---|---|
| 6,798,753 B1 * | 9/2004 | Doganata et al. | 370/260 |
| 2007/0005363 A1 | 1/2007 | Cucerzan et al. | |
| 2009/0041221 A1 * | 2/2009 | Sherman et al. | 379/210.01 |
| 2009/0110182 A1 * | 4/2009 | Knight et al. | 379/265.12 |
| 2009/0180451 A1 | 7/2009 | Alpert et al. | |
| 2010/0016003 A1 * | 1/2010 | Shapiro et al. | 455/466 |
| 2010/0027777 A1 * | 2/2010 | Gupta et al. | 379/210.01 |
| 2010/0210249 A1 * | 8/2010 | Gisby | 455/414.1 |
| 2010/0260327 A1 * | 10/2010 | Ray | 379/93.23 |
| 2010/0330972 A1 * | 12/2010 | Angiolillo | 455/418 |

FOREIGN PATENT DOCUMENTS

WO WO 99/17524 4/1999

* cited by examiner

*Primary Examiner* — Joseph J Nguyen
(74) *Attorney, Agent, or Firm* — SpryIP, LLC

(57) ABSTRACT

A probability that one or more contacts may be selected is determined. The probability that one or more contact may be selected may be determined based on one or more information types stored in a device and which may be used by a prediction engine module to determine the probability that one or more contacts may be selected by a user. Such information types may include location information of the user and location information associated with contacts in a contact list; distance to a particular location; time, both absolute and relative to times associated with calendar entries, and the like. High probability contacts may be assembled and displayed in a predictive contact list.

7 Claims, 5 Drawing Sheets

500 — PREDICTIVE CONTACT LIST DISPLAY

| CONTACT LIST ENTRIES (IN ALPHABETICAL ORDER) |
|---|
| ALISHA MILLER |
| ALISON |
| ANDY SMITH |
| ANNA WINTER |
| AUNT MARGRET |
| BENJAMIN TAYLOR |
| BERND |
| BETTY SHIELDING |
| BOBBY CARTWRIGHT |

| PREDICTED ENTRIES (IN DECREASING ORDER) |
|---|
| CLARK W. GRISWOLD (CEO OF GRISWOLD HOLDING INC.) |
| SOPHIA JOHNES (PERSONAL ASSISTANT TO CLARK W. GRISWOLD) |

FIG. 5

PREDICTIVE CONTACT INFORMATION REPRESENTATION

RELATED CASES

This Application is related to co-pending U.S. patent application Ser. No. 12/704,449, entitled "METHODS AND APPARATUS FOR CONTACT INFORMATION REPRESENTATION" and U.S. patent application Ser. No. 12/704,455, entitled "METHODS AND APPARATUS FOR PROVIDING PRESENCE SERVICE FOR CONTACT MANAGEMENT REPRESENTATION", which Applications were filed contemporaneously herewith on Feb. 11, 2010. The entirety of the co-pending Applications are incorporated herein by reference.

BACKGROUND

Address books or contact information list, in an electronic form, are databases that are used for storing entries that are now colloquially known as "contacts". Due to the ever growing list of capabilities of today's computer devices (such as desktop computers, laptops, smartphones and the like), the information stored in contact entries has also grown such that individual entries now may include without limitation: (1) a name; (2) a picture associated with the name; (3) various phone number(s) (i.e., home, work, wireless, etc.); (4) one or more email addresses (both personal and work-related); (5) fax number(s); (6) user name(s) associated with various services (i.e. instant messaging applications, social networks, etc.); and (7) various other related information associated with a user (i.e., birthdays, names of related family members, anniversary dates, etc.).

In addition to the large amount of information now stored within individual contact entries associated with a user's contact information list, the number of contacts stored in the user's contact information list has also grown such that the navigation of the contacts may be difficult and time consuming. The large number of stored contacts results from a number of factors, including the intermingling of less frequently used contact entries among contact entries that are more commonly used. Furthermore, because contact entries are now frequently entered and shared during an initial meeting with a personal acquaintance or business associate (whether manually or electronically), these names tend to become forgotten by the user, making it difficult to later recall the name of that particular acquaintance or business associate.

Various methods and apparatus exist in the prior art for managing a user's contact information list entries. In one example, contact information list entries may be organized according to various user-defined groupings. However, these various groupings must be manually assembled by the user, and therefore have many of the same limitations of prior art address books and contact lists as discussed above.

Other common contact information list implementations, such as the contact information list available in many existing smartphones, also include a search function which permits a user to navigate his or her contact information list by entering information associated with an entry (i.e., a contact entry's first or last name). However, the ability to locate specific contact information under this model is again predicated on the user's ability to accurately recall specific information about that entry.

Many of today's contact information lists in wireless communication devices or smartphones allow a user to arrange contacts by arranging contacts in special lists. For example, a user can have contacts arranged by those contacts which have been most recently dialed, from which the user has most recently received or most recently missed a call, etc., each sorted by date (and often time). However, these special lists are call-oriented, and thus they arrange contacts by information related to calls to the contacts that have taken place (or were supposed to be taking place), and are therefore predicated on either: (1) frequency of communication with a particular contact entry; or (2) proximity in time between a prior communication or an attempted communication.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

FIG. 5 illustrates a predictive contact list display according to another embodiment.

DETAILED DESCRIPTION

Overview

In one or more implementations, a probability that one or more contacts may be selected is determined. The probability that one or more contact may be selected may be determined based on one or more information types stored in a device and which may be used by a prediction engine module to determine the probability that one or more contacts may be selected by a user. Such information types may include location information of the user and location information associated with contacts in a contact list; distance to a particular location; time, both absolute and relative to times associated with calendar entries, and the like. High probability contacts may be assembled and displayed in a predictive contact list. The predictive contact list may be a subset of contact information associated with a user's global contact list.

Exemplary System

Figure 1:
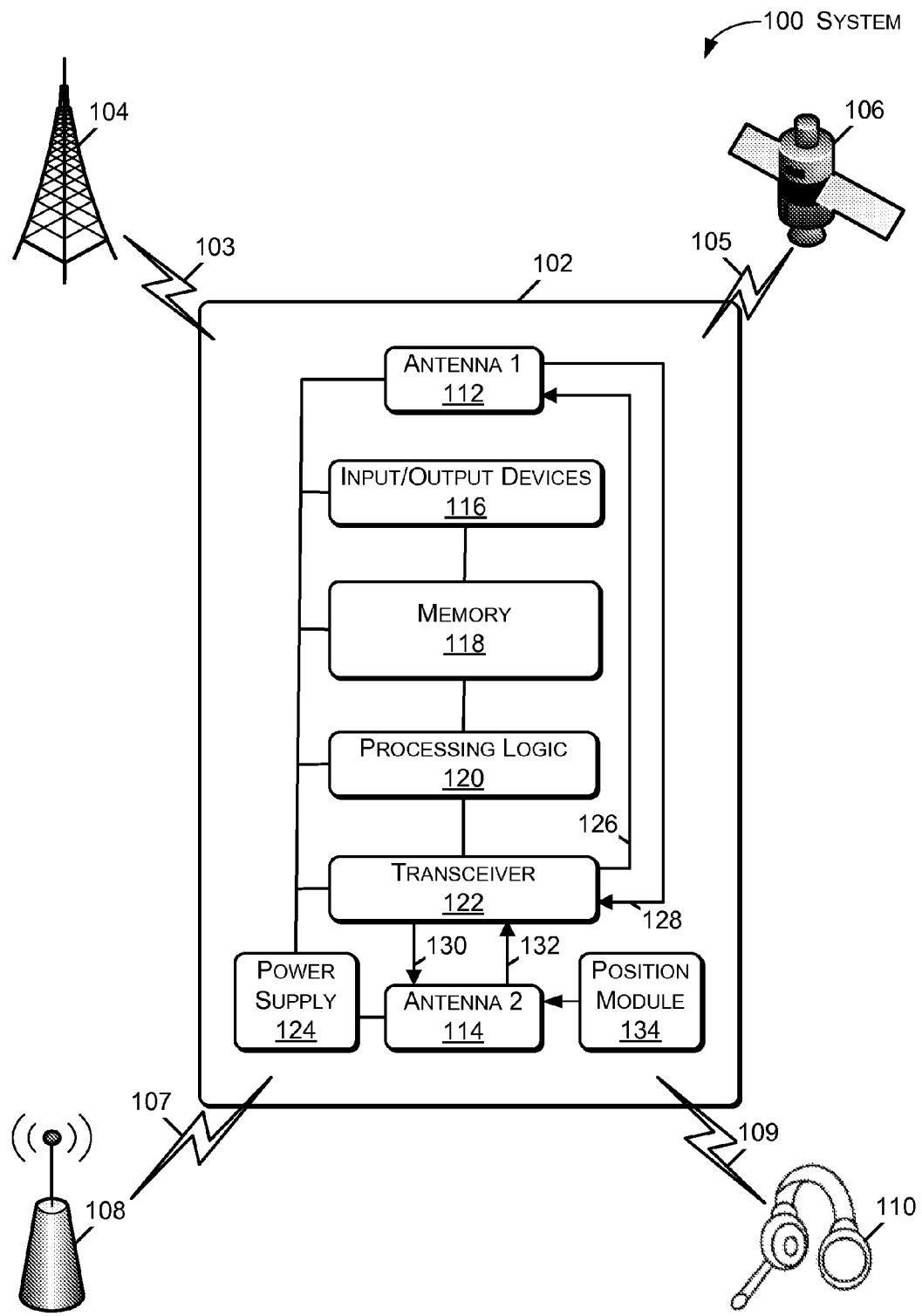
FIG. 1 illustrates an implementation of a system to transmit and receive wireless signals via one or more antennas.

FIG. 1 illustrates an embodiment of a system 100 to transmit and receive wireless signals via one or more antennas. The system 100 may include a wireless communication device 102 that is configured to transmit wireless signals to, and receive wireless signals from, one or more external devices. The wireless signals may include voice traffic, data, control information, or any combination thereof. The wireless communication device 102 may be implemented in any number of ways, including as a smart phone, a hand-held computer device (e.g., a personal digital assistant (PDA)), a mobile telephone, a media playing device, a portable gaming device, a personal computer, a laptop computer, another suitable wireless communication device, or any combination thereof.

In one embodiment, the wireless communication device 102 may transmit and/or receive wireless signals 103 via a base station 104. The base station 104 may be included in a wide area wireless communication network/system, such as but not limited to, time-division multiple access (TDMA) systems, such as cellular radio telephone systems that comply with the global system for mobile communications (GSM) telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards; and digital communication systems also include combined TDMA and CDMA systems, such as cellular radio telephone systems that comply with the universal mobile telecommunications system (UMTS) standard, which specifies a third generation (3G) mobile system being developed by the European Telecommunications Standards Institute within the International Telecommunication Union's IMT-2000 framework. Such wireless communication systems may implement high-speed downlink packet access (HSDPA), which is an evolution of WCDMA that provides higher bit rates by using higher order modulation, multiple spreading codes, and downlink-channel feedback information. Another evolution of WCDMA is Enhanced Uplink (EUL), or High-Speed Uplink Packet Access (HSUPA), that enables high-rate packet data to be sent in the reverse, or uplink, direction. Furthermore, such wireless communication systems may include new radio access technologies (RATs) that are being considered for evolved 3G and fourth generation (4G) communication systems a worldwide interoperability for microwave access (WiMAX) network, or any combination thereof.

In another embodiment, the wireless communication device 102 may transmit and/or receive wireless signals 105 via a communication satellite 106. Further, the wireless communication device 102 may transmit and/or receive wireless signals 107 via a wireless access point 108. The wireless access point 108 may be included in a wide area wireless network or a wireless local area network, such as a Bluetooth network or an Institute of Electrical and Electronics Engineers (IEEE) 802.11 protocol network. Additionally, the wireless communication device 102 may transmit and/or receive wireless signals 109 via a headset 110, such as a Bluetooth headset or other Bluetooth enabled device.

In a particular embodiment, the wireless communication device 102 includes a first antenna 112 and a second antenna 114. The first antenna 112 and the second antenna 114 may be placed in various locations of the wireless communication device 102. For example, the first antenna 112 may be placed at a bottom portion of the wireless communication device 102 and the second antenna 114 may be placed at a top portion of the wireless communication device 102. In another embodiment, the wireless communication device 102 includes a single antenna, or a plurality of antennas greater than the two illustrated in FIG. 1. The wireless communication device 102 may also include one or more input/output devices 116. In an illustrative embodiment, the input/output devices 116 may include a microphone, a speaker, a touchpad display, a cursor control device, such as a mouse, a keypad, or any combination thereof.

The wireless communication device 102 may also include memory 118 and processing logic 120. The memory 118 may include random access memory (RAM), flash memory, read only memory (ROM), PROM, EEPROM, DRAM, SDRAM, DDR/2 SDRAM, EDO/FPMS, RLDRAM, SRAM, a hard disk, or any combination thereof. Additionally, the memory 118 may store one or more applications configured to enable transmission and/or reception of wireless signals. For example, the memory 118 may store an application configured to send and receive wireless signals related to telephone calls, such as voice traffic or control information. In another example, the memory 118 may store an application configured to request and receive website data, an application configured to transmit and receive text messages, an application configured to transmit and receive picture messages, an application configured to transmit and receive video messages, or any combination thereof. The applications stored in the memory 118 may include software instructions, hardware, or any combination thereof.

In addition, the wireless communication device 102 may include a transceiver 122 and a power supply 124, such as a battery. The transceiver 122 may be configured to utilize a first transmission path 126 to transmit wireless signals to the one or more external devices 104, 106, 108, and 110. Further, the transceiver 122 may be configured to utilize a first receiving path 128 to receive wireless signals from the one or more external devices 104, 106, 108, and 110. The transceiver 122 may also be configured to utilize a second transmission path 130 to transmit wireless signals to the one or more external devices 104, 106, 108, and 110 and to utilize a second receiving path 132 to receive wireless signals from the one or more external devices 104, 106, 108, and 110. The first transmission path 126, the first receiving path 128, the second transmission path 130, and the second receiving path 132 may also include other devices, such as filters, amplifiers, switches, hybrid circuits, or any combination thereof.

The wireless device 102 may also include a position module 134. The position module 134 may be implemented to receive signals transmitted by the communication satellite 106. The communication satellite 106 may be enabled to transmit signals that allow the position module 134 to determine a geographical location of the wireless communication device 102. Proper determination of a geographical location of the wireless communication device 102 may require receiving signals from a plurality of satellites, such as the communication satellite 106 illustrated in FIG. 1. The position module 134 may be functionally capable of processing signals associated with GPS satellites of the United States of America, the Galileo satellites of the European Union, GLONASS satellites of Russia, and any other satellites of a global navigation satellite system. The position module 134 may also include functionality that enables determining a geographical location of the wireless communication device 102 by way of cell identification and signal strengths of the home and neighboring cells or access points. Furthermore, the position module 134 may acquire a geographical location of the wireless communication device 102 using network based techniques. Such techniques utilize wireless network infrastructure to identify a location of the wireless communication device 102. Additionally, the position module 134 may be enabled to determine a geographical location of the wireless communication device 102 by way of angle-of-arrival (AOA) positioning, time-of-arrival (TOA) positioning, time-difference-of-arrival (TDOA) positioning, and assisted GPS (A-GPS). Still further, the position module 134 may be enabled to receive and process wireless information obtained from Radio-frequency Identification (RFID) sources and the like, and may use such obtain information to establish estimated geographical location information associated with the wireless communication device 102.

Figure 2:
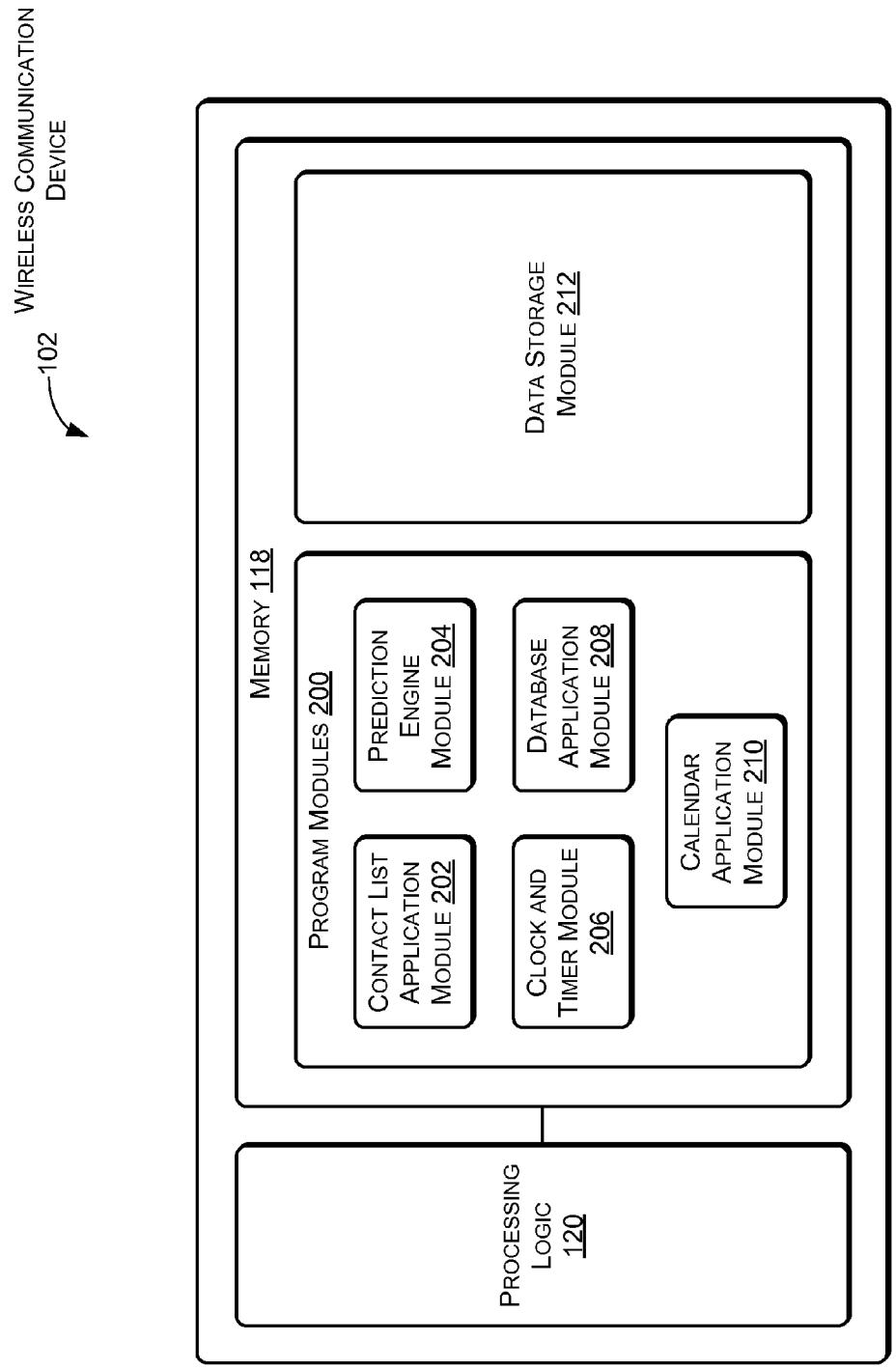
FIG. 2 illustrates various modules and logic that may be associated with a wireless communication device or computer device.

FIG. 2 illustrates various modules and logic that may be associated with the wireless communication device 102 or more generally a computer device. As discussed and illustrated in connection with FIG. 1, the wireless communication device 102 may include the processing logic 120 and a memory 118. The memory 118 may store a plurality of program modules 200. The plurality of program modules 200 may include a contact list application module 202, a prediction engine module 204, a clock and timer module 206, a database application module 208, and a calendar application module 210. In addition, the memory may include a data storage module 212. The program modules 200 may be computer instructions that, when executed by the processing logic 120, implement various procedures and methods described herein. Although the program modules 200 are shown collectively in the memory 118, the program modules 200 may also be distributed among disparate computer device that may be networked together or wirelessly coupled continuously or from time-to-time. In addition, although the data storage module 212 is shown as being integrated with the memory 118, various content stored therein may also be distributed among disparate memory associated with one or more computer devices.

The contact list application module 202 may be executed to create and modify a contact list that may be stored in the data storage module 212. The contact list may accommodate a plurality of contacts, with each of the contacts including a variety of fields. For example, the contact list may include a plurality of contacts, with each of the contacts associated with one or more of the following fields, for example: entry number, name, and one or more telephone numbers, ring tones, pictures, e-mail addresses, home address and the like. The contact list application module 202 may also be executed to create and modify a predictive contact list according to the implementations described herein. Such a predictive contact list may be stored in the data module 212, with each contact associated with the predictive contact list including one or more of the foregoing fields.

The prediction engine module 204 may be executed and used in connection with various other of the program modules 200 to facilitate creation of a predictive contact list according to the implementations described herein. The clock and timer module 206 may be executed for time keeping, including actual, elapsed, countdown, and so forth. The database application module 208 may be executed to create and maintain a database that stores information to aid the prediction engine module 204 in probabilistically determining if one or more contacts in the contacts list may be chosen based on various information compiled and observed by the prediction engine module 204. The calendar application module 210 may be executed to create and maintain an electronic calendar to enable a user to insert and view calendar events for appointments, such appointments may be associated with one or more contacts, maintain to-do lists, and the like. Certain implementations herein may make use of the calendar application module 210 and the electronic calendar created and maintained thereby when generating a predictive contact list.

Exemplary Procedures

Exemplary procedures are described below. It should be understood that certain acts need not be performed in the order described, and may be modified, and/or may be omitted entirely, depending on the circumstances. The acts described may be implemented and executed by a computer, processor or other computer device, such as a wireless device, based on instructions stored on one or more computer-readable storage media. The computer-readable storage media can be any available media that can be accessed by a computer device to implement the instructions stored thereon. As used herein, the term "instructions", "computer program" or "software" is meant to include any sequence or human or machine cognizable acts which perform a function. The exemplary procedures and acts may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Furthermore, the disclosed exemplary procedures and associated acts may be hardware and firmware as well, or alternatively as some combination thereof.

Figure 3:
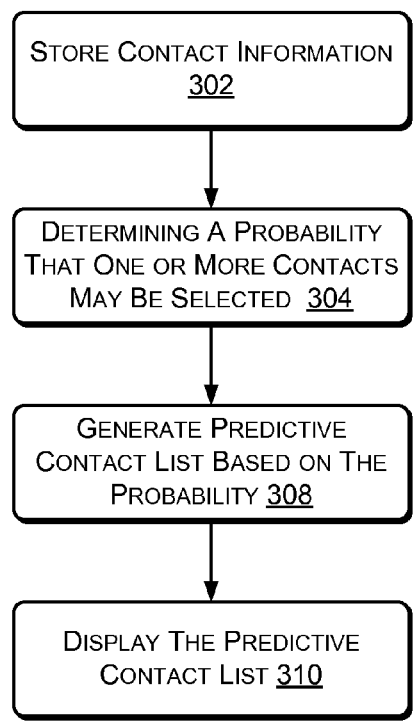
FIG. 3 is a flow diagram of a procedure useable to compile or generate a predictive contact list based on a probability that contacts in the contact list will be selected.

FIG. 3 is a flow diagram of a procedure useable to compile or generate a predictive contact list based on a probability that contacts in the contact list will be selected. The procedure is compatible with devices, elements and wireless networks illustrated in FIGS. 1-2, as well as entities and devices other than those illustrated and discussed herein.

At Act 302, contact information for various contacts associated with a user may be stored in memory. In an exemplary implementation, the contact information for a given contact may be entered manually by the user via inputs received from a user using a given user interface. The user interface can consist of any number of well known user interfaces such as a keyboard, a touch-screen, voice-recognition software, and the like. This manually entered data can then be stored on one or more computer devices such as the exemplary wireless communication device 102 illustrated in FIG. 1.

In an alternative to the manual entering of data or as a supplemental procedure to the manual entering of data, the contact information could also be downloaded from a remote software application to the computer device, via either a wired or wireless network connection. The remote software application, upon gaining proper authorization from the user, may assemble and distribute various pre-entered contact information into a contact list (e.g., a global contact list). For example, in one exemplary implementation, a user might enter a username and password associated with a web service mail client. The user's computer device then uses a software application to log into the user's web service mail client, compile contact information stored on the web service mail servers, optionally check for redundant information, and download the contents of the contact list from the web service for storage locally on the user's computer device.

As another mechanism (whether supplemental to the aforementioned techniques or as an alternative), the contact information may be exchanged via an automated mechanism and stored locally on a computing device. For example, a user's computer device may be equipped with software and/or hardware which permit the user to automatically pull contact information (or alternatively receive push-based messages) from a remote application once contact information of interest to the user becomes available. One such implementation accomplishes this functionality via a Bluetooth network interface resident on the user's computing device. The Bluetooth network interface may detect the presence of other capable devices within range of the computer device (either directly or via an intermediate (e.g., stationary) device which is also equipped with short range technology), and whenever a contact of interest to the computer device is present, a software application on the computer device may make a request for contact information of the contact of interest and exchange contact information over a Bluetooth ad hoc network.

In case the short range communication implemented to acquire contact information of interest to the user that becomes available is performed by way of a stationary or mobile intermediate device, the intermediate device may provide the location and/or time information of interest.

At Act 304, a probability that one or more contacts may be selected is determined. The probability that one or more contact may be selected may be determined based on one or more information types stored in a device and which may be used by the prediction engine module to determine the probability that one or more contacts may be selected by a user. Such information types may include location information of the user and location information associated with contacts in a contact list; distance to a particular location; time, both absolute and relative to times associated with calendar entries, and the like. Before describing further acts of the procedure, the various information types will be described in the following. The various information types gathered in connection with the user and the user's contacts may be stored in a database. The database application module may facilitate storage and maintenance of such information.

Geographic information (e.g., location information) associated with the user and the contacts may be stored in memory. For example, for the user and any given contact, the various geographic locations visited may be logged in memory.

In one exemplary implementation, the various geographic locations stored are associated with the user's physical locations. Preferably these geographic locations are stored as a function of time; i.e., the geographic locations stored also possess temporal information (such as the time when the user was located at a given location, and/or the duration the user was in a given location). For example, many of today's modern smartphones also possess a global positioning system (GPS) or A-GPS receiver or chipset, such as the exemplary implementations illustrated in FIGS. 1 and 2. The integrated GPS capability of the smartphone can then be utilized in conjunction with a software application to store geographic information for later use when arranging a user's contacts list. Alternative geographic locating techniques with more or less levels of granularity including well known triangulation techniques, association with a wireless base station or access point (e.g., cellular, Wi-Fi, etc.) could also be used in lieu of, or in addition to, GPS systems.

RFID or other "near field" systems could also feasibly be used to generate location information associated with a user's mobile device during a particular event, such as a phone call received or placed by the mobile device. For example, interrogation of one or more passive and/or active RFID tags used in a grocery store or other like establishment may reveal stored information, such as an address, that may be used to establish a current location of the mobile device. The generated location information may be linked the particular event and used in a procedure designed to generated a predictive contact information.

In alternate implementations, the use of user-provided location data, such as by the user entering their current location via a touch-screen interface (e.g., touching an icon representing their home, office, favorite restaurant, car, etc.), speech input system, etc., is contemplated.

In one implementation, geographic information associated with a user's contacts may also be stored in memory. For example, for any given contact in a user's contact list, the various geographic locations visited by that contact can also be logged in memory. The system utilized for storing geographic information associated with the user may be the same as that utilized for storing geographic information associated with contacts (i.e. for purposes of system simplicity); however it is contemplated that disparate systems can also be used and the location information culled from these disparate systems.

Location information for the contacts may be obtained using any number of different techniques, and from any number of different sources, which may or may not be the same as those referenced above for obtaining the user's location or position. For example, the locations of contacts may be provided by the user's mobile network (directly, where the contacts are also user's of the same service provider), or indirectly (such as from other mobile service providers) based on e.g., association with a given base station or AP by the contact (s), GPS data sent from their receivers, user-entered data, address(es) associated with the contacts, and so forth.

Coordinated transactions between the user and a contact (e.g., Bluetooth inquiry/pairing/bonding events) may also be used as a mechanism for determining user and/or contact location. In this sense, the user's "absolute" position at a given time may not be known, but their position relative to the contact is known definitively, due to the short-range nature of the PAN (e.g. Bluetooth) interface. Hence, in one such variant, the user's mobile phone uses its Bluetooth interface to conduct a well known pairing or bonding operation with the contact's Bluetooth-equipped mobile device when they are in sufficient proximity to one another (say, 10 meters or so, depending on various conditions). The pairing exchange is stored in the user's mobile device, and the Bluetooth ID for the contact is associated with an entry associated with the contact, along with a time reference. Hence, the "smart" contact application of the invention knows that the two persons "met" at the recorded time, although it may not know precisely where.

In another variant, the storage of the Bluetooth pairing/bonding exchange is used to trigger a reading of the user's GPS receiver, which then associates an absolute geographic coordinate with the pairing event, and the position data can be saved along with the Bluetooth-related data if desired. The absolute position data can then be correlated if desired to known user-specific locations such as the user's home, office, favorite restaurant, child's school, etc.

In another variant, the user's contact list application can be configured to invoke the contact's device to transmit its GPS coordinates via e.g., the PAN interface between the two devices. For instance, where both devices are outfitted with contact list applications according to the present implementations, the user's device can, during bonding or pairing (or thereafter), transmit a request for current GPS coordinates from the contact device. This approach is useful when, inter alia, the user's device does not have absolute positioning capability (i.e., no GPS receiver).

The foregoing "relative" positioning approaches have the advantage of being based on data from only user devices (e.g., the user's handset, and the contact's handset), without having to go back to the host mobile network(s) to obtain location data for the contact.

The possibility to request transmission of absolute location information from a network entity apparatus to the mobile device should not be ruled out. In a slightly different embodiment the Bluetooth pairing/bonding process may trigger transmission of absolute location information or assistance data from a network entity and the assignment of absolute positioning data generated in the mobile device to user specific or user predefined locations is done network entity assisted, respectively.

A significant obstacle expected in the acquisition of geographic information associated with various contacts in a user's contact list is privacy. In order to address issues of privacy, an exemplary implementation of the aforementioned function stores geographic location about various contacts in a user's contact list in a form so that it is not directly accessible by the user. For example, a business associate of the user might want the user to have access to geographic information associated with that business associate strictly for the purpose of allowing the user to organize and arrange a user's contact list; however the business associate would likely not like the user to know specific locations of where that business associate was located at any given time. Accordingly, the geographic information gathered by the system can optionally be stored in an encrypted manner, which would only be accessible to the contact list representation software (e.g. via a private key) and not directly to the user.

In another implementation, the database application module associates (1) temporal proximity to a known or projected event, and (2) historical information regarding activities (e.g., calls or meetings with contacts) on the date and/or time of interest with contact in the contact list. This associated information may be stored in memory. This associated information may also include data regarding geographic proximity to a location associated with the event (if any).

As an example of the foregoing, consider a user who has a good friend or significant other who has a birthday on November 5 every year. Each year on or about that day, the user calls their friend to wish them "happy birthday", or they meet at their favorite restaurant for dinner. Hence, the contact list application may be programmed to determine the then-current date (say November 3), and determine that the friend is a "high probability" contact based on the historical meetings/calls. As the temporal difference between current date/time and target date/time reduces, the priority of that contact may be increased. This approach also advantageously acts as a "passive" reminder to the user of the impending event, in that whenever the user invokes their contact list function during that time period, they will increasingly see that contact (friend) elevated in priority, thereby reminding them that some event of significance is impending. The logic of the foregoing functionality can also be implemented such that, for example, after the target date/time, the priority: (1) may slope off with time, generally symmetric with in the run-up to that date/time (just in case the user missed the event for some reason); or (2) there is a steep roll-off or even filtration, such that the priority is significantly reduced or set to "zero". This latter option can also be masked or enabled with any actual data regarding indicating that the user was located at the target location (e.g., favorite restaurant, friend's house, etc.) on or about the target date, such that it is known that the "event" requirements have been met by the user.

In another implementation, the database application data keeps track of and stores a user's communication with contacts in the contact list. In an exemplary embodiment, this data is stored locally on a user's wireless device, as the device would likely have ready access to this information. This data includes relevant information such as phone calls received by the user, phone calls dialed by the user, or data otherwise associated with missed calls on a user's wireless device. In addition, data associated with the duration of phone calls received and phone calls dialed may also be stored. Furthermore, information about the parties involved in the call as well as the number (i.e. work, home, cellular, etc.) or nickname utilized for that call may also also be stored. As a result of the additional information, the characteristics of the call can be classified with finer granularity and later on (i.e. during presentation) the type of the forecast communication event (business, leisure, etc.) could be presented to the user together with the name and contact information. In addition to information regarding phone calls, the data stored could also keep track of SMS texts, e-mails, instant messages, etc. The database application may also keep track of addresses associated with the phone calls.

At Act 306, the predictive engine uses at least some of the information described in the foregoing to generate a predictive contact list from the user's contact list information. More specifically, the predictive engine may use at least some of the foregoing information to determine the probability that a contact(s) will be called or contacted. High probability contacts may be added to the predictive contact list. At Act 308, the predictive contact list is displayed on a first or second display of the user's wireless device and/or may be displayed on a first or second display of another device coupled to the user's wireless device. This other device could for instance be a display device optimized for displaying contact list.

As can be readily appreciated, the Acts 302-308 of the procedure 300 can afford a user with great flexibility in sorting a listing of contact entries in a user's contact list. Specifically, these entries can be sorted and arranged according to any number of differing contact information parameters. For example, and without limitation, the representation of contact information for a user can be arranged according to: (1) current distance to a location where the last meeting with a contact took place; (2) time elapsed since having met with a particular contact; (3) time elapsed since having been near to a given contact; (4) current distance to a location where the last meeting with a contact took place; (5) current distance to a particular location while the user was on the phone (or otherwise in data communication) with a particular contact; (6) current distance to a particular location associated with an event linked to a contact; relative time to a event linked to a contact, etc.

Implementation Examples

Implementation examples are described below. It should be understood that the following examples are non-limiting.

In a first example, usage history of the device is maintained by continuously keeping a sequence of the last n cell-IDs up to date. This is may be done in a shift register. Each time the wireless device is choosing a new (stronger) cell to camp on the list is updated accordingly. Therefore, as a new cell-ID is added, other cell-IDs (but the last one) are shifted one position in the register. The last cell-ID is simply dropped. Whenever an event is detected the event is classified (here: it's a mobile originated call) and given a unique event ID. Other useful information may also be gathered (depending on the type of event, here: the phone number or the name of the person called). Then a set of data is created including (at least) the sequence of the last n cell-IDs the mobile device has camped on, the unique event ID, the type of the event, and possibly other useful information. Such a data set is then stored in a database for later use by the prediction engine. In an alternative or in addition to the above, absolute location (e.g., location derived by GPS) may be gathered as part of the history information maintained by the device.

Figure 4:
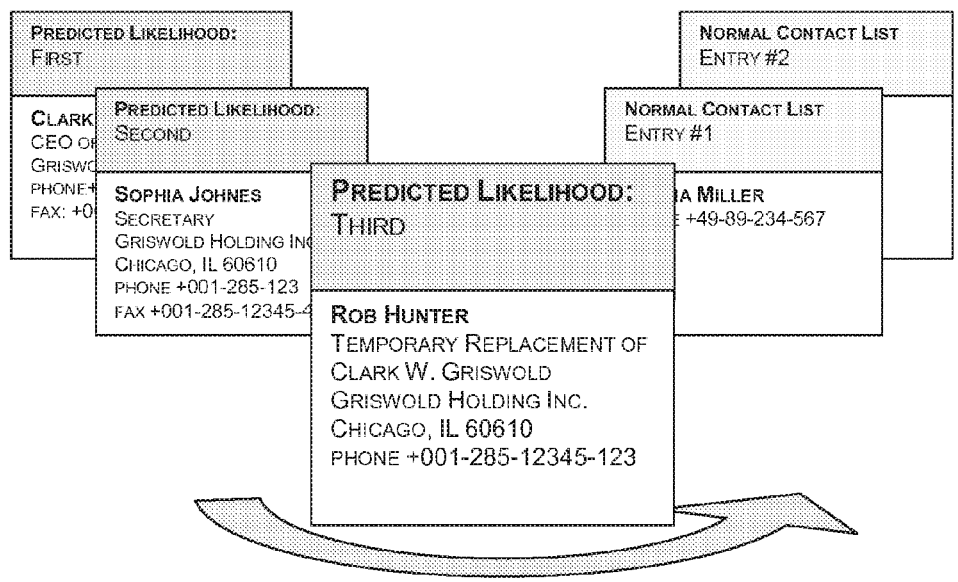
FIG. 4 illustrates a predictive contact list display according to one embodiment.

While the mobile device is moving through the cells of a mobile cellular network, the RAT (RAT—Radio Access Technology) Modem (for example a modem for UMTS according to 3GPP's suite of specifications) detects a number of successive cell-IDs (Info A) or other location dependant pieces of information (Info B), such as GPS data. These cell-IDs and other location dependant information are transferred to the prediction engine where in a first step the current behaviour pattern is calculated. This may also be a periodic process outputting a number of data sets, each of which contains a sequence of cell-IDs and other information. In a second step the results of these continuous calculation endeavours are compared to a sequence of cell-IDs and/or location information from previous routes of the wireless device. For this comparison multiple sets of data containing at least one sequence of cell-IDs and/or location information are read from the database. Each data set contains a unique ID for a corresponding event. If the prediction engine module finds at least one matching pattern, the prediction engine in a third step reads the event information from the database using the event ID(s) for each matching pattern. The event information may include the type of the event and references to contact list entries (e.g., names, phone numbers, category, etc.). The prediction engine then predicts the imminence of events in a fourth step possibly taking other pieces of information received from other sensors/building blocks (Info C) into account. Such other pieces of information may include date and time information, past, current, and/or future calendar events, distance to an event location, and the like. The routine of this fourth step may possibly reduce the number of (references to) contact list entries that were gathered during step 3. The outcome of the entire prediction process is used by the prediction engine in a fifth step to supply the contact list application with a reduced set of contact list entries (e.g., a predictive contact list). In order to do so the prediction engine may resolve the (reduced) set of references gathered before. The contact list application is now enabled to displays those contact list entries for which a higher probability of being called has been predicted separated from the 'normal contact list' representation. The manner of separation could for instance be a different colour, the font size, an animated view, etc. This depends very much on implementation details. See FIGS. 4 and 5, which illustrate a predictive contact list display 400 and a predictive contact list display 500, respectively. As an alternative to the lists of FIGS. 4 and 5, a portion of a complete contact list may be displayed and a soft key may be enabled to switch between the complete contact list representation and the predictive contact list representation.

In a second example, whenever an event is detected the event is classified (e.g., a wireless originated call) and given a unique event ID. Other useful information is also gathered (depending on the type of event, here: date and time, the phone number of the called person). Then a set of data is created including the unique event ID, the type of the event, the phone number, and possibly other useful information. Such a data set is then stored in the database for later use by the prediction engine.

Upon activation of the contact list functionality on the wireless device the prediction engine sends out queries to the device's internal clock and timer module in order to retrieve the current date and time and to the calendar application module to obtain current calendar entries, such as start time or end time of an appointment. In this scenario a first step (calculation of current behaviour pattern) is simple. It's just the collection of information from the clock and calendar functional modules. In a second step the results of the calculation endeavour is compared to previous events that happened under similar prerequisites. For this comparison, multiple sets of data containing at least one piece of date and time information are read from the database. Each data set contains a unique ID for a corresponding event. If the predictive engine finds at least one matching pattern, the predictive engine in a third step reads the event information from the database using the event ID(s) for each matching pattern. The event information may include references to contact list entries (e.g., names, phone numbers, category, etc.). The prediction engine then predicts the imminence of events in a fourth step possibly taking other pieces of information received from other sensors/building blocks into account. The routine of this fourth step may possibly reduce the number of (references to) contact list entries that were gathered during step 3. The outcome of the entire prediction process is used by the prediction engine in a fifth step to supply the contact list application with a reduced set of contact list entries. In order to do so the prediction engine resolves the (reduced) set of references gathered before. The contact list application is now enabled to display those contact list entries for which a higher probability of being called has been predicted separated from the 'normal contact list' representation. Again, the manner of separation could for instance be a different color, the font size, an animated view, etc. This depends very much on implementation details. See FIGS. 4 and 5, which illustrate the predictive contact list display 400 and the predictive contact list display 500, respectively. As an alternative to the lists of FIGS. 4 and 5, a portion of the complete contact list may be displayed and a soft key may be enabled to switch between the complete contact list representation and the predictive contact list representation.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method, comprising:
  compiling a contact list based on a probability that one or more contacts in a contact list may be selected;
  storing the list of contacts in a storage; and
  determining the probability, the determining act including:
    determining a location of a computer device;
    determining a present point in time;
    determining a past event occurred within a predetermined distance of the determined location; and
    determining the past event occurred at a point in time equal or about equal to the determined present point in time,
  wherein compiling includes adding a contact associated with the past event to the list of contacts.

2. The method according to claim 1, wherein the past event is a communication session between the computer device and another computer device associated with the contact.

3. The method according to claim 1, wherein determining the probability further includes:
  determining a location of a computer device, and the compiling act includes:
  adding a contact to the list of contacts having location information associated therewith that falls within a predetermined distance of the location of the computer device.

4. The method according to claim 1, wherein the past event is a communication session between the computer device and another computer device associated with the contact.

5. The method according to claim 1, wherein the present point in time is calendar date.

6. The method according to claim 1, wherein determining the probability, further includes:
  determining a present clock time or estimated clock time;
  determining an event scheduled within a predetermined timeframe of the present clock time or estimated clock time, and the compiling act includes:
  adding a contact associated with the event to the list of contacts.

7. The method according to claim 6, wherein the event is a scheduled appointment and the predetermined timeframe is at least greater than an intended duration of the scheduled appointment.

* * * * *